No. 882,355. PATENTED MAR. 17, 1908.
E. H. SUHL.
REPLANTING ATTACHMENT FOR CULTIVATORS.
APPLICATION FILED NOV. 29, 1907.
2 SHEETS—SHEET 1.
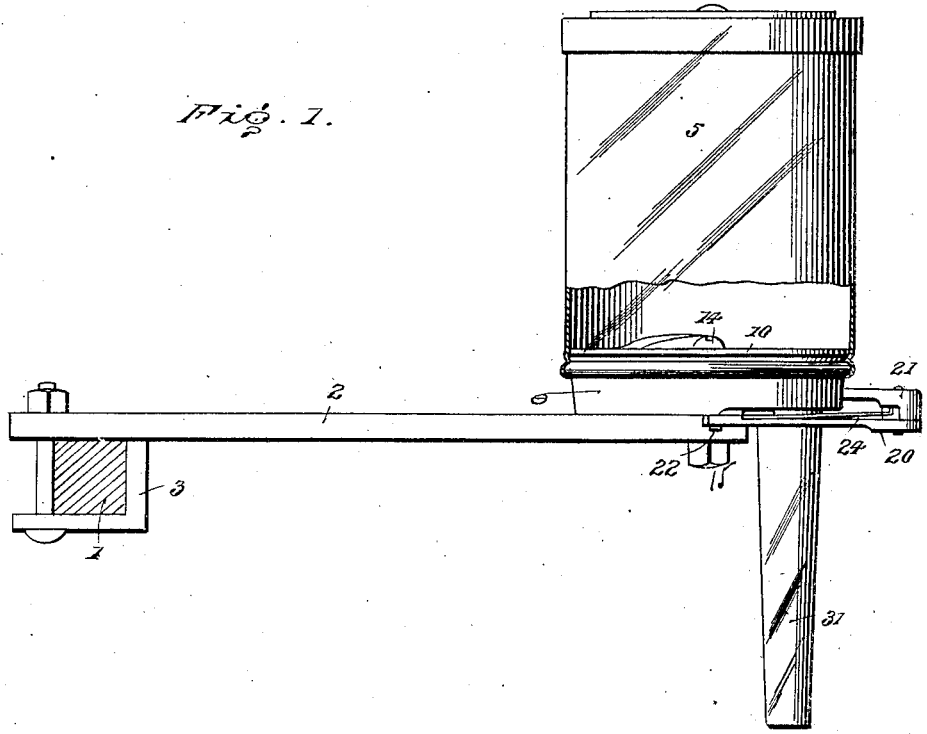
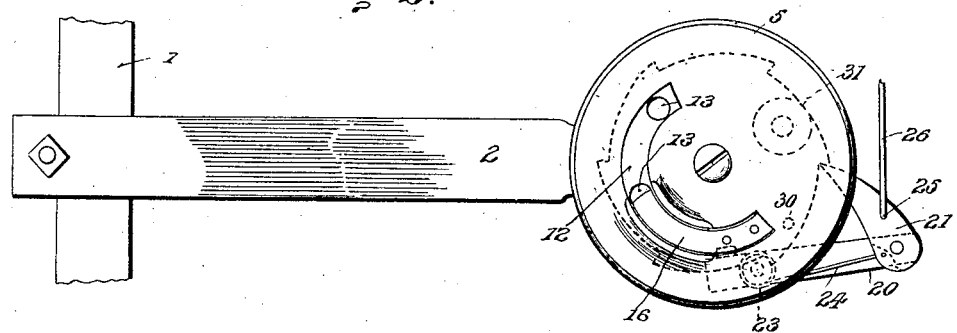
Witnesses
C. P. Wright Jr.
A. H. Ehrling
Inventor
E. H. Suhl
By A. S. Pattison
Attorney
THE NORRIS PETERS CO., WASHINGTON, D. C.

No. 882,355. PATENTED MAR. 17, 1908.
E. H. SUHL.
REPLANTING ATTACHMENT FOR CULTIVATORS.
APPLICATION FILED NOV. 29, 1907.
2 SHEETS—SHEET 2.
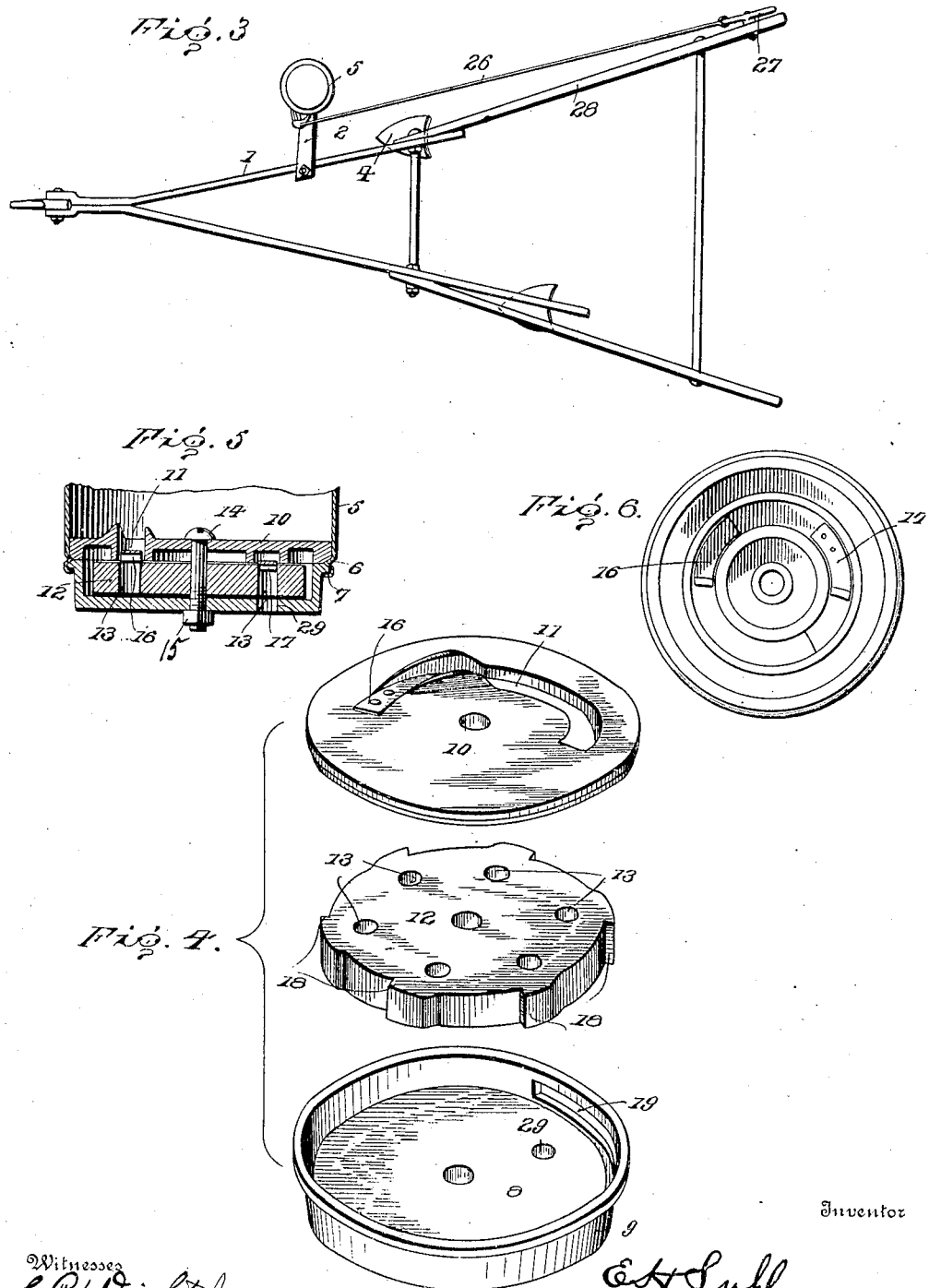

UNITED STATES PATENT OFFICE.

EDWARD H. SUHL, OF SPARKS, OKLAHOMA, ASSIGNOR OF ONE-HALF TO BERT SPRINGER, OF SPARKS, OKLAHOMA.

REPLANTING ATTACHMENT FOR CULTIVATORS.

No. 882,355.	Specification of Letters Patent.	Patented March 17, 1908.

Application filed November 29, 1907. Serial No. 404,385.

*To all whom it may concern:*

Be it known that I, EDWARD H. SUHL, a citizen of the United States, residing at Sparks, in the county of Lincoln and State of Oklahoma, have invented certain new and useful Improvements in Replanting Attachment for Cultivators, of which the following is a specification, reference being had therein to the accompanying drawing.

My invention relates to improvements in replanting attachments for cultivators.

The object of my invention is to provide an improved planter which may be readily attached to a cultivator or plow for the purpose of replanting while the crop is being worked or cultivated, thus avoiding the expense of replanting in the ordinary manner.

Another object of my invention is to provide a more simple, cheap and effective planter to accomplish the desired results.

In the accompanying drawings, Figure 1, is a side elevation of my improved planter applied to the beam of a cultivator or plow, showing the seed box partly in section. Fig. 2, is a top plan view of Fig. 1, showing the seed box or cover removed. Fig. 3, is a top plan view of the cultivator showing my planter attached thereto. Fig. 4, is a perspective view of the several parts separated, forming the feed mechanism. Fig. 5, is a vertical, sectional view of the lower end of the seed box. Fig. 6, is an enlarged bottom plan view of the plate forming the bottom of the seed box.

Referring now to the drawings, 1 represents a cultivator or plow beam to which is attached a laterally-extending beam 2 by means of which the clip 3, or said laterally-extending beam, may be secured in any desired manner, as this forms no part of my invention. The said beam is of such a length as to extend over the row of corn being cultivated, and after the seed are dropped the cultivator tooth or shovel-plow 4 covers the seed and works the corn. Carried by the outer end of said beam is the seed box 5 which as shown, is of a cylindrical form, although any desired form of seed box may be used. The lower end of said seed box is crimped inwardly, as indicated at 6, and the said crimped portion extends over the flange 7 of the saucer-shaped bottom 8 of the hopper, whereby the said bottom is held in the seed box. The side wall 8 of said saucer-shaped member or bottom 8 extends below the lower end of the receptacle, the purpose of which I will now proceed to describe. Resting upon the upper edge of the vertical wall 9 of the saucer-shaped member or bottom 8 within the seed box is a cover plate 10 which is provided with a segmental slot 11 arranged around the center thereof. Within the saucer-shaped member below the plate 10 is a disk 12 having a series of openings 13 which register with the segmental slot 11, as shown in Fig. 2 of the drawings. Passing vertically through the bottom 8, the plate 10, and the disk 12, is a bolt 14 having a nut 15 thereon, whereby the several parts are secured together, and the plate 10 held in its proper position within the seed box.

Secured to the upper face of the plate 10 is a spring 16 which extends into one end of the segmental slot 11 and engages the disk 12 and frictionally holds the disk from being rotated beyond a certain distance during each movement of the operating means, and which also serves as a cut-off for the corn and prevents the excess corn in the box from passing into the openings.

Carried by the lower face of the plate 10 is a spring ejector 17 which is arranged directly on the opening 13, and the end thereof is adapted to enter the said openings 13 and force the grain therefrom when it registers with the orifice 29 in the member 8.

The disk 12 has its outer periphery provided with ratchet teeth 18, and the vertical wall 9 of the saucer-shaped member 8 is provided with a cut-away portion 19 through which an operating pawl 21 may pass, and engage the ratchet teeth of the disk for operating the same. Pivotally carried by the lower face of the saucer-shaped member or bottom 8 is a lever 20, the outer end of which carries a pivoted pawl 21 which extends through the cut-away portion 19 and engages the ratchet teeth 18 of the disk 12. The said lever is mounted upon a stud 22, and surrounding the same between the member 8 and the lever is a coiled spring 23 which has one end secured to the member 8, while the opposite end 24 extends outwardly and is secured to the inner end of the pawl 21, which holds the pawl normally in engagement with the ratchet disk and simultaneously holds the lever 20 in the position shown in Fig. 2.

Secured to the pawl 21 on the inside of its pivotal connection, as indicated at 25, is a cable or rod 26 which extends rearwardly and is connected to the L-shaped lever 27 which is pivoted to the handle 28 of the plow or cultivator in easy reach of the operator.

The member 8 is provided with an opening 29 which is in a line with the series of openings 13 in the disk 12 and beyond the segmental slot 11 in the plate 10. A stop 30 is carried by the bottom 7 for limiting the movement of the lever 20.

By the construction herein set forth it will be seen that the seed box is off to one side of the plow beam, and directly over the row of corn being cultivated, and the operator can at will pull upon the lever 27 which draws the pawl 21 forward, causing the disk 12 to move a distance sufficient to bring one of the openings 13 in communication with the opening 29 in the bottom, whereby the grain within said opening 13 is forced from the disk by the spring 17. The number of grain fed can be regulated by providing the disks 12 with larger or smaller openings, as is the usual practice in planters of this character.

Secured to the member 8 and surrounding the opening 29, is a tube 31 which conveys the grain to the ground, and the planter, as shown and described, is attached to the plow beam in advance of the plow or cultivator, and after the seeds have been dropped, they are covered by the plow or cultivator, whereby a great saving of replanting is accomplished.

Having thus described my invention, what I claim and desire to secure by Letters Patent, is:—

1. The combination with a plow beam, of a laterally extending beam attached thereto, a seed box carried by the outer end of said beam, a rotary disk for feeding the grain from said box, ratchet teeth carried by the outer periphery of said disk, a lever pivoted to the seed box, a pawl carried by the outer end of said lever, a spring for normally holding the lever in its outward position and holding the pawl in engagement with the ratchet teeth of the disk, and an operating cable attached to the pawl for drawing the same forward and operating the disk.

2. The combination with a plow beam, of a laterally-extending beam attached thereto, a seed box carried by the outer end of the said beam, a saucer-shaped bottom carried by the lower end of the seed box, a plate carried by the upper edge of said bottom within the box, a disk within the saucer-shaped bottom below the plate and having a series of vertical openings registering with an opening in the bottom, the plate having a segmental slot above the openings in the disk, a spring carried by the plate and extending through the segmental slot and engaging the outer periphery of the disk having ratchet teeth, a bolt passing through the saucer-shaped member, the disk and the plate, a lever pivotally carried by the lower face of the saucer-shaped member, a pawl carried by the outer end of said lever, a spring surrounding the pivot of the lever and having one end secured to the member and the other end secured to the pawl, and normally holding the lever in its outward position, and the pawl in an inward position passing through an opening in the side walls of the saucer-shaped bottom and engaging the ratchet teeth of the disk, and an operating cable attached to said pawl.

3. The combination with a plow beam, of a laterally-extending beam attached thereto, a seed box carried by the outer end of said beam, a plate within said box and having a segmental slot therein, a disk below the plate and having openings registering with the slot, a spring carried by the upper face of the plate and extending through the segmental slot, and engaging the disk, and a spring carried by the lower face of the plate and adapted to force the grain from the openings in the disk.

4. The combination with a plow beam, of a laterally-extending beam attached thereto, a seed box carried by the outer end of the beam, a bottom secured within the lower end of the box and having an opening adjacent one side, a ratchet disk resting upon the bottom and having a series of openings registering with the opening in the bottom, a plate above the disk and having a segmental slot registering with the openings in the disk, a spring carried by the upper face of the plate and extending through the segmental slot, and frictionally engaging the disk, a spring carried by the lower face of the plate and adapted to force the grain from the openings in the disk, a bolt passing through the bottom, disk and plate, a lever pivotally carried by the lower face of the bottom, a pawl pivotally carried by the outer end of said lever, a spring surrounding the pivot of the lever and having one end secured to the bottom and the other end secured to the pawl and normally holding the lever in its outward position with the pawl in engagement with the ratchet disk, a rod or cable attached to the pawl, and an operating lever pivoted to the handle of the cultivator and having the rod or cable attached thereto.

5. The combination with a plow beam, of a laterally-extending beam attached thereto, a seed-box carried by the outer end of said beam, a ratchet disk within the seed box and having feed openings therein, a lever pivoted to the seed box, a pawl carried by the lever, and a coil spring surrounding the pivot of the lever and having one end secured to the seed box and the opposite end secured to the inner end of the pawl, substantially as described.

6. The combination with a plow beam, of a laterally-extending beam attached thereto, a seed box carried by the outer end of said beam, a ratchet disk pivotally mounted within said seed box and having feed openings therein, a plate above the ratchet disk and having a segmental slot above the openings in the ratchet disk, a spring carried by the plate, and extending through the segmental slot and closing one of the openings in the disk, a spring carried by the lower face of the disk and adapted to force the grain therefrom, a lever pivoted to the seed box, a pawl carried by the lever, and a coil spring surrounding the pivot of the lever and having one end secured to the seed box, and the opposite end secured to the ratchet on the inside of its connection with the lever, and means for operating said lever.

In testimony whereof I affix my signature in presence of two witnesses.

EDWARD H. SUHL.

Witnesses:
H. S. EMMERSON,
FRED RICHARDSON.